United States Patent
Lin et al.

(10) Patent No.: US 11,895,036 B2
(45) Date of Patent: Feb. 6, 2024

(54) MANAGING ACKNOWLEDGEMENT PACKETS IN AN UPLINK DATA PACKET STREAM

(71) Applicant: QUALCOMM Incorporated, San Diego, CA (US)

(72) Inventors: Yih-Hao Lin, San Diego, CA (US); Ravi Agarwal, San Diego, CA (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 17/653,270

(22) Filed: Mar. 2, 2022

(65) Prior Publication Data

US 2023/0283562 A1  Sep. 7, 2023

(51) Int. Cl.
*H04L 47/2466* (2022.01)
*H04L 47/36* (2022.01)
*H04L 47/19* (2022.01)
*H04L 5/00* (2006.01)

(52) U.S. Cl.
CPC ........ *H04L 47/2466* (2013.01); *H04L 5/0055* (2013.01); *H04L 47/196* (2013.01); *H04L 47/36* (2013.01)

(58) Field of Classification Search
None
See application file for complete search history.

(56) References Cited

U.S. PATENT DOCUMENTS

| | | | | |
|---|---|---|---|---|
| 10,122,606 | B1* | 11/2018 | Korhonen | H04L 43/08 |
| 2002/0196785 | A1* | 12/2002 | Connor | H04L 47/10 370/392 |
| 2012/0201136 | A1* | 8/2012 | Williams | H04L 47/18 709/224 |
| 2015/0134809 | A1* | 5/2015 | Tofighbakhsh | H04L 69/321 709/224 |
| 2020/0153594 | A1* | 5/2020 | Kumar | H04L 5/0055 |

* cited by examiner

*Primary Examiner* — Lonnie V Sweet
(74) *Attorney, Agent, or Firm* — The Marbury Law Group, PLLC

(57) ABSTRACT

In embodiments of systems and methods for managing acknowledgement packets in an uplink data packet stream including secure or encrypted data packets, a computing device may identify uplink acknowledgement (UL ACK) packets within the uplink data packet stream, and may accelerate processing of the identified UL ACK packets. In some embodiments, UL ACK packets may be identified based on whether packet lengths of packets meet a packet length threshold or meet a packet length range. In some embodiments, UL ACK packets may be identified based on information for identifying such packets receiving via a cross-layer application program interface (API). In some embodiments, UL ACK packets based whether packets include a specified differentiated services field codepoint (DSCP) in a packet header portion that is not encrypted.

27 Claims, 10 Drawing Sheets

MANAGING ACKNOWLEDGEMENT PACKETS IN AN UPLINK DATA PACKET STREAM

BACKGROUND

Communication networks may facilitate the provision to end point computing devices of services that utilize data streams, packets, or other continuously-provided information, generally referred to as real-time applications. Many real-time applications use a transport protocol that requires a receiving computing device to acknowledge the successful receipt of data packets by sending an acknowledgement (ACK) message to a sending computing device. To avoid the inefficiency of waiting for acknowledgment of every packet before sending the next packet, the sending computing device uses a congestion window mechanism to determine an amount of data (e.g., a number of packets) to send at a time. The sending computing device reduces its transmission rate when the computing device does not receive an ACK packet within an expected timeframe. Thus, feedback latency, such as ACK latency, may impact data throughput, which may degrade the performance of real-time applications.

SUMMARY

Various aspects include systems and methods performed by a computing device for managing acknowledgement packets in an uplink data packet stream that includes encrypted payloads. Various aspects may include identifying uplink acknowledgement (UL ACK) packets within the uplink data packet stream including encrypted payloads, and accelerating processing of the identified UL ACK packets.

Some embodiments may include receiving, via a cross-layer application program interface (API) from an application sending the uplink data packet stream, a request to accelerate processing of UL ACK packets. In some embodiments, identifying UL ACK packets within the uplink data packet stream may include identifying UL ACK packets based on whether packet lengths of packets meet a packet length threshold or meet a packet length range.

In some embodiments, identifying UL ACK packets within the uplink data packet stream may include identifying two or more groups of packets within the uplink data packet stream that meet a packet length threshold, in which each of the two or more groups of packets within the uplink data packet stream that meet a packet length threshold is associated with a respective detection frequency and a packet length range, and identifying packets as UL ACK packets in response to determining that a packet length of the packets meets the packet length range of the most frequently detected of the two or more groups of packets.

In some embodiments, identifying UL ACK packets within the uplink data packet stream may include receiving via a cross-layer application program interface (API) information enabling the computing device to identify packets for accelerated processing, and using the received information to identify packets within the uplink data packet stream for accelerated processing. In some embodiments, identifying UL ACK packets within the uplink data packet stream may include receiving information via a cross-layer application program interface (API) that packets having a specified differentiated services field codepoint (DSCP) value should receive accelerated processing, and identifying packets within the uplink data packet stream having the specified DSCP value in a packet header portion that is not encrypted as UL ACK packets.

In some embodiments, receiving information via the cross-layer API that packets having a specified DSCP value should receive accelerated processing may include receiving information via the cross-layer API that packets having a specified DSCP value are UL ACK packets. In some embodiments, accelerating the processing of identified UL ACK packets may include one of placing identified UL ACK packets in a high priority queue for uplink transmission, or altering a header of identified UL ACK packets to identify the identified UL ACK packets for accelerated processing. In some embodiments, the UL ACK packets may include Stream Control Transmission Protocol (SCTP) packets or Quick User Datagram Protocol Internet Connections (QUIC) packets.

Further aspects include a computing device having a processor configured to perform one or more operations of any of the methods summarized above. Further aspects include processing devices for use in a computing device configured with processor-executable instructions to perform operations of any of the methods summarized above. Further aspects include a non-transitory processor-readable storage medium having stored thereon processor-executable instructions configured to cause a processor of a computing device to perform operations of any of the methods summarized above. Further aspects include a computing device having means for performing functions of any of the methods summarized above.

BRIEF DESCRIPTION OF THE DRAWINGS

FIGS. 5C and 5D illustrate operations that may be performed as part of the method for enhancing coverage for initial access according to some embodiments.

DETAILED DESCRIPTION

Figure 1:
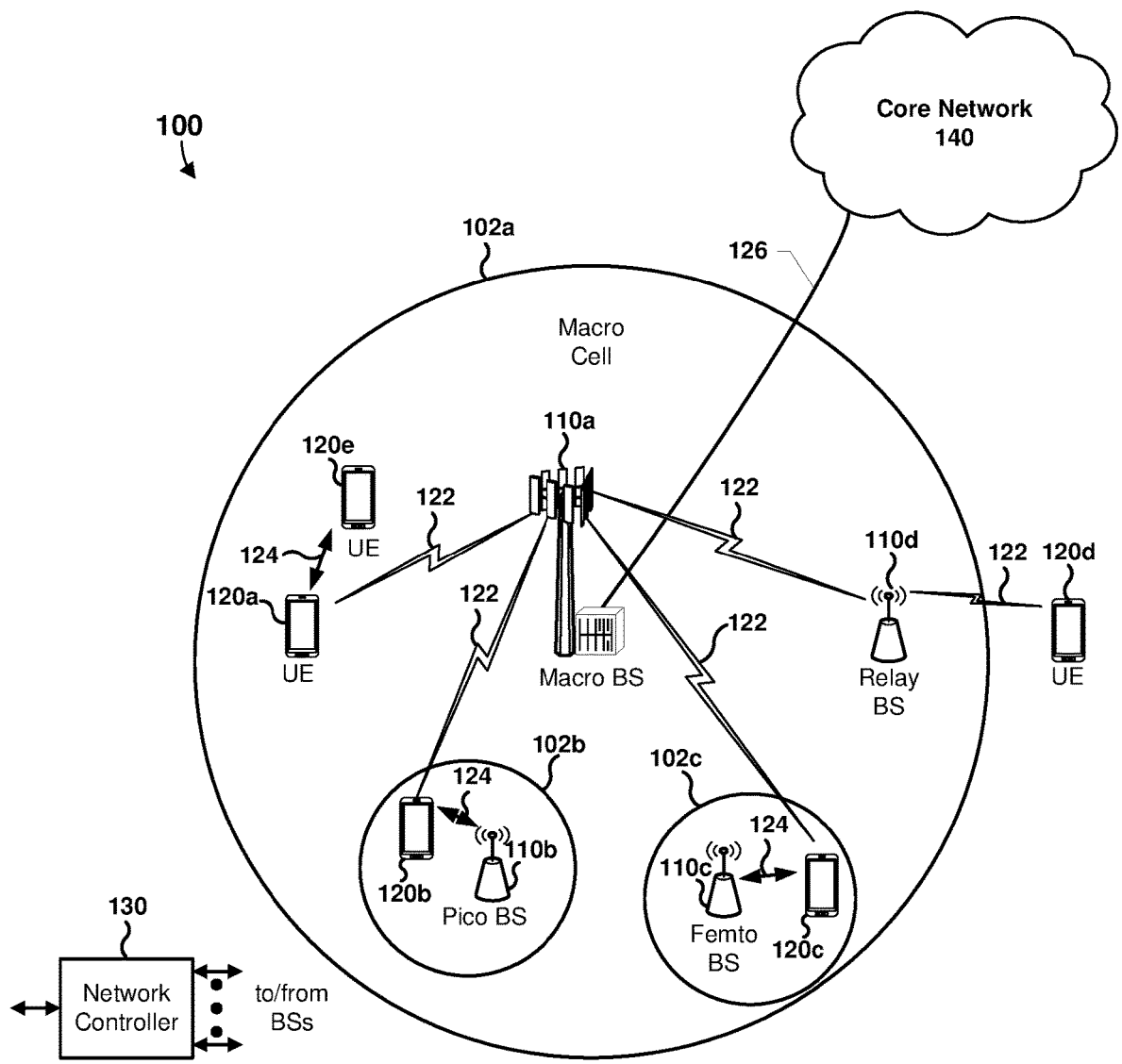
FIG. 1 is a system block diagram illustrating an example communications system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and computing devices configured to perform the methods for managing acknowledgement packets in an uplink data packet stream that includes encrypted payloads. Various embodiments may improve the performance of computing devices and real-time applications by enabling computing devices to identify uplink acknowledgement (UL ACK) packets in an uplink data packet stream that includes encrypted payloads, and accelerate processing of identified UL ACK packets. Various embodiments may enable the identification and accelerated processing of UL ACK packets that cannot be identified by other techniques, such as inspection of the contents of a payload of such packets (e.g., by deep packet inspection). Some embodiments may include receiving a request to accelerate processing of UL ACK packets, in which the request is received via a cross-layer application program interface (API) from an application sending the uplink data packet stream.

The term "computing device" is used herein to refer to any one or all of wireless router devices, wireless appliances, cellular telephones, smartphones, portable computing devices, personal or mobile multi-media players, laptop computers, tablet computers, smartbooks, ultrabooks, palm-top computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (Wi-Fi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

Many real-time applications use a transport protocol that requires a receiving computing device to acknowledge the successful receipt of data packets by sending an ACK message or ACK packet to a sending computing device. The sending computing device may use a congestion window mechanism to determine an amount of data (e.g., a number of packets) to send at a time. The larger the congestion window, the more data the sending computing device may send, resulting in a higher data throughput, and the faster the sending computing device may recover form a stalled congestion window. In contrast, the sending computing device may reduce its transmission rate when the sending computing device does not receive an ACK packet within an expected timeframe. Feedback latency, such as ACK latency, may impact data throughput, which may degrade the performance of real-time applications that rely on timely receipt of data and commands.

To reduce ACK latency, a computing device may identify and quickly send uplink ACK packets to the sending computing device. In communication protocols such as Transfer Control Protocol (TCP), a receiving computing device can identify TCP ACK packets by inspecting the contents of a packet payload, e.g., using a technique such as deep packet inspection. The computing device may accelerate the processing of such ACK packets, for example, allowing a TCP congestion window size to grow faster in a slow-start phase.

However, identifying ACK packets in communication protocols that secure or encrypt data payloads may not be possible, thus preventing acceleration of ACK packet processing. Secured payload packets are not readily analyzed by conventional techniques such as deep packet inspection. For example, the Stream Control Transmission Protocol (SCTP) (utilized by Web Real-Time Communication (WebRTC)) and the Quick User Datagram Protocol (UDP) Internet Connections (QUIC) use packets having a secured payload, such as encrypted packets. Some latency sensitive applications, such as online or "cloud" gaming applications (e.g., xCloud), network conferencing applications (e.g., Zoom, WebEx, etc.), and the like may employ protocols that secure or encrypt data payloads to provide greater communication security.

Various embodiments include methods and computing devices configured to perform the methods for managing acknowledgement packets in an uplink data packet stream in communication protocols that secure or encrypt data payloads (e.g., a payload portion of the packet). In various embodiments, a computing device may detect or identify uplink acknowledgement (UL ACK) packets within an uplink data packet stream including encrypted payloads, and accelerate processing of the identified UL ACK packets. In some embodiments, one or more processes in a modem data layer of the computing device may identify the UL ACK packets. In some embodiments, the modem data layer may include a cross-layer application program interface (API) that is configured to receive from an application sending the UL ACK packets information for processing the UL ACK packets. In some embodiments, the information may indicate that the processing of the UL ACK packets should be accelerated. For example, the information received via the cross-layer API may indicate that processing should be accelerated for packets having a certain code or value in a header portion, such as a particular differentiated services field codepoint (DSCP) value. In some embodiments, the information received via the cross-layer API may include a request to accelerate processing of UL ACK packets (e.g., from the application sending the UL ACK packets). In some embodiments, accelerating the processing of identified UL ACK packets may include placing identified UL ACK packets in a high priority queue for uplink transmission. In some embodiments, accelerating the processing of identified UL ACK packets may include altering a header of identified UL ACK packets to identify the identified UL ACK packets for accelerated processing.

In some embodiments, the computing device may identify UL ACK packets based on whether packet length of packets meet a packet length threshold or meet a packet length range. In some embodiments, an ACK packet may be expected to be below a packet length, or to fall within a packet length range. In some embodiments, the computing device may inspect uplink packets of a specified flow (i.e., an uplink data packet stream) and identify packets having a packet length below (or equal to or below) a packet length threshold. In some embodiments, the computing device may inspect uplink packets of a specified flow and identify packets having a packet length that meets a packet length range (e.g., having a packet length greater than (and/or equal to) a lower packet length threshold and less than (and/or equal to) a higher packet length threshold. In some embodiments, an uplink data packet stream may be specified according to one or more characteristics of the uplink data packet stream, such as a destination Internet Protocol (IP) address, a port identifier, a DSCP value, and/or other information.

In some embodiments, the computing device may detect or determine packet lengths and packet length frequencies of a plurality of packets of an uplink data packet stream including encrypted payloads. In some embodiments, ACK packets may be expected to be relatively frequent, as well as relatively small (as compared to data packets). In some embodiments, the computing device may identify UL ACK packets by identifying two more groups of packets of a specified flow (i.e., an uplink data packet stream). In such embodiments, each of the two or more groups may be associated with a detection frequency and a packet length range. In some embodiments, the computing device may identify one or more groups of packets having a packet length below a threshold or within a packet length range. In some embodiments, the computing device may identify the most frequently detected of such groups of packets. In some embodiments, the computing device may identify one or more packets as UL ACK packets in response to determining that the packet length of the one or more packets meets (falls within) the packet length range of the most frequently detected group of packets. In some embodiments, the computing device may identify one or more packets as UL ACK packets in response to determining that the packet length of the one or more packets meets (falls within) the packet length range of the most frequently detected group of packets, in which the packet lengths of the packets (or the packet length range) is below a threshold packet length.

In some embodiments, the application sending the uplink data packet stream including encrypted payloads may provide information, such as via a cross-layer API, that packets having certain information in the packet header portion, such a specified DSCP value, should receive accelerated processing. In some embodiments, the application may specify a DSCP value that is associated with low latency or accelerated processing. In some embodiments, the DSCP value may be associated with data packets and/or ACK packets sent by the application. In some embodiments, the DSCP value may be associated only with ACK packets (i.e., the DSCP value may uniquely identify UL ACK packets).

In some embodiments, the computing device may not include the cross-layer API. In such embodiments, the computing device may accelerate processing of all uplink packets having the specified DSCP value. For example, the application may include the specified DSCP value in all packets associated with a particular low latency application. In such embodiments, the computing device may accelerate processing of all uplink packets including the specified DSCP value, including all UL ACK packets in the uplink data packet stream.

Various embodiments may improve the performance of computing devices and real-time applications by enabling computing devices to accelerate processing of identified UL ACK packets in communication protocols that include encrypted payloads. Various embodiments may be particularly useful for identifying UL ACK packets having an obfuscated or encrypted payload portion, as may be used in various secure streaming protocols. In this manner, various embodiments may enable the identification and accelerated processing of UL ACK packets that cannot be identified by other techniques, such as inspection of the contents of a payload of such packets (e.g., by deep packet inspection).

FIG. 1 is a system block diagram illustrating an example communications system 100 suitable for implementing any of the various embodiments. The communications system 100 may be a 5G New Radio (NR) network, or any other suitable network such as a Long Term Evolution (LTE) network. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of wireless devices (illustrated as wireless devices 120a-120e in FIG. 1). The communications system 100 also may include a number of network devices (110a, 110b, 110c, 110d) and other network entities, such as a network node or a base station. A network device is an entity that communicates with wireless devices, and also may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. In various communication network implementations or architectures, a network device may be implemented as an aggregated base station, as a disaggregated base station, an integrated access and backhaul (IAB) node, a relay node, a sidelink node, etc. Also, in various communication network implementations or architectures, a network device (or network entity) may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. Each network node, RU, or base station may provide communication coverage for a particular geographic area. In 3GPP, the term "cell" can refer to a coverage area of an RU, a network node, a base station, or a base station subsystem serving this coverage area, or a combination thereof, depending on the context in which the term is used. The core network 140 may be any type core network, such as an LTE core network (e.g., an EPC network), 5G core network, etc.

A network device (e.g., a network node or base station) 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A network device for a macro cell may be referred to as a macro network device. A network device for a pico cell may be referred to as a pico network device. A network device for a femto cell may be referred to as a femto network device or a home network device. In the example illustrated in FIG. 1, a network device 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "network node," "RU," "eNB," "base station," "NR BS," "gNB," "TRP," "AP," "node B," "5G NB," and "cell" may be used interchangeably herein.

In some examples, a cell may not be stationary, and the geographic area of the cell may move according to the location of a mobile network device, such as a mobile network node or mobile base station. In some examples, the base stations 110a-110d may be interconnected to one another as well as to one or more other network devices, such as base stations or network nodes (not illustrated) in the communications system 100 through various types of backhaul interfaces, such as a direct physical connection, a virtual network, or a combination thereof using any suitable transport network The network devices 110a-110d may communicate with the core network 140 over a wired or wireless communication link 126. The wireless devices 120a-120e may communicate with the network devices 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay network device 110d). A relay station is an entity that can receive a transmission of data from an upstream station (for example, a network device or a wireless device) and send a transmission of the data to a downstream station (for example, a wireless device or a network device). A relay station also may be a wireless device that can relay transmissions for other wireless devices. In the example illustrated in FIG. 1, a relay station 110d may communicate with the macro network device 110a and the wireless device 120d in order to facilitate communication between the network device 110a and the wireless device 120d. A relay station also may be referred to as a relay network device, a relay base station, a relay, etc.

The communications system 100 may be a heterogeneous network that includes network devices of different types, for example, macro network devices, pico network devices, femto network devices, relay network devices, etc. These different types of network devices may have different transmit power levels, different coverage areas, and different impacts on interference in communications system 100. For example, macro network devices may have a high transmit power level (for example, 5 to 40 Watts) whereas pico network devices, femto network devices, and relay network devices may have lower transmit power levels (for example, 0.1 to 2 Watts).

A network controller 130 may couple to a set of network devices and may provide coordination and control for these network devices. The network controller 130 may communicate with the network devices via a backhaul. The network devices also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, user equipment (UE), etc.

A macro network device 110a may communicate with the communication network 140 over a wired or wireless communication link 126. The wireless devices 120a, 120b, 120c may communicate with a network device 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using Time Division Duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a network device, another device (for example, remote device), or some other entity. A wireless computing platform may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. The wireless device 120a-120e may be included inside a housing that houses components of the wireless device 120a-120e, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some implementations, two or more wireless devices 120a-120e (for example, illustrated as the wireless device 120a and the wireless device 120e) may communicate directly using one or more sidelink channels 124 (for example, without using a network device 110a-110d as an intermediary to communicate with one another). For example, the wireless devices 120a-120e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-120e may perform scheduling operations, resource selection operations, as well as other operations described elsewhere herein as being performed by the network device 110a-110d.

Figure 2:
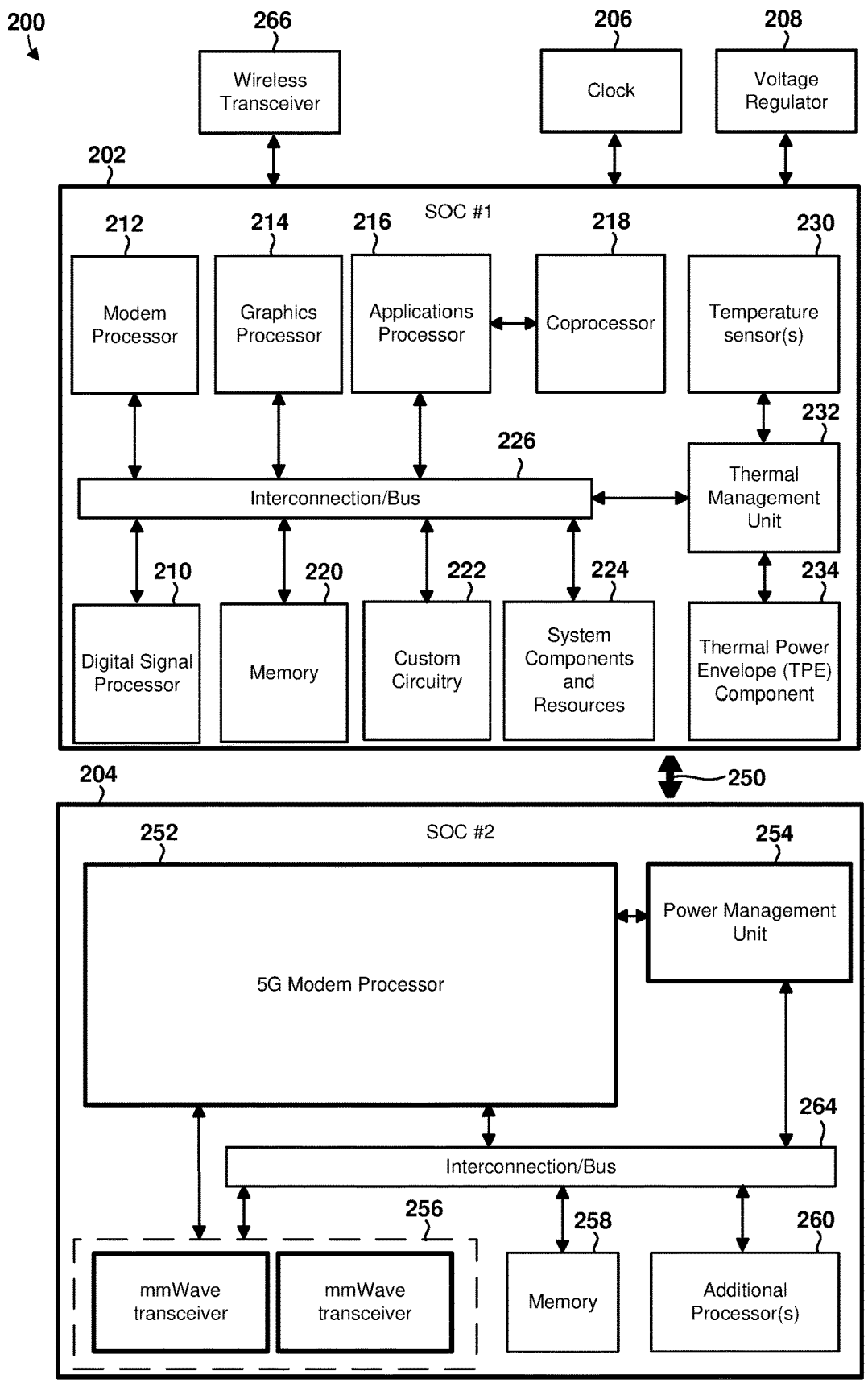
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing system 200 (which may be a SIP in some embodiments) includes a two SOCs 202, 204 coupled to a clock 206, a voltage regulator 208, and a wireless transceiver 266 configured to send and receive wireless communications via an antenna (not shown) to/from a wireless device (e.g., 120a-120e) or a network device (e.g., 110a-110d). In some implementations, the first SOC 202 may operate as central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), and/or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (such as CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
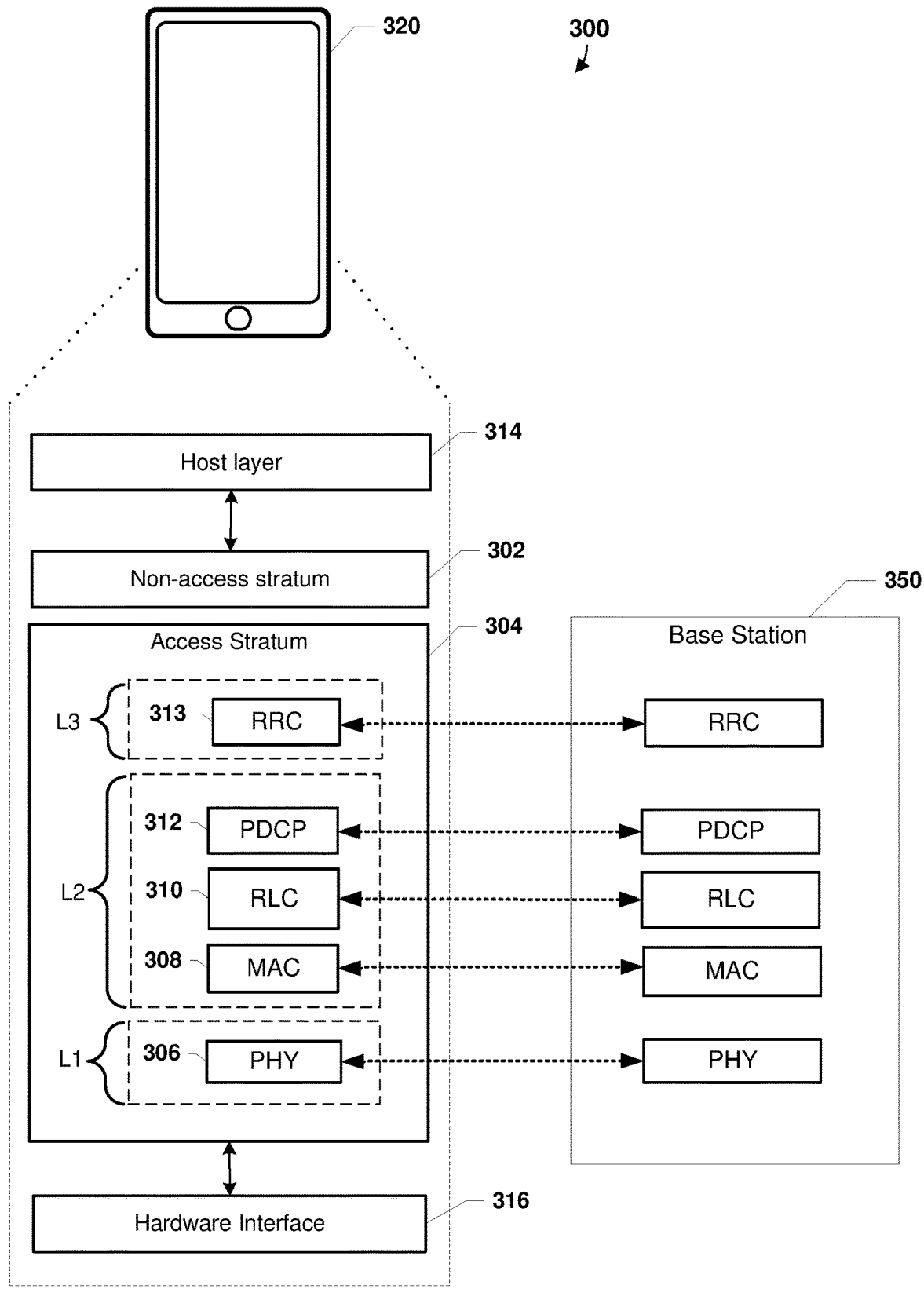
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120a-120e, 200) and a network device 350 (e.g., the network device 110a-110d) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network 140. The AS 304 may include functions and protocols that support communication between a SIM(s) (such as SIM(s) 204) and entities of supported access networks (such as a network device, network node, RU, base station, etc.). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In some implementations, Layer 2 may include a media access control (MAC) sublayer 308, a radio link control (RLC) sublayer 310, and a packet data convergence protocol (PDCP) 312 sublayer, and a Service Data Adaptation Protocol (SDAP) 317 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the wireless device 320 and the base station 350.

In various embodiments, the SDAP sublayer 317 may provide mapping between Quality of Service (QoS) flows and data radio bearers (DRBs). In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as an IP layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

In various network implementations or architectures, the different logical layers 308-317 may be implemented in an aggregated or monolithic base station architecture, or alternatively, in a disaggregated network device architecture, and various logical layers may implemented in one or more of a CU, a DU, an RU, a Near-RT RAN Intelligent Controller (RIC), or a Non-Real Time (Non-RT) RIC. Further, the network device 350 may be implemented as an aggregated base station, as a disaggregated base station, an integrated access and backhaul (IAB) node, a relay node, a sidelink node, etc.

Figure 4:
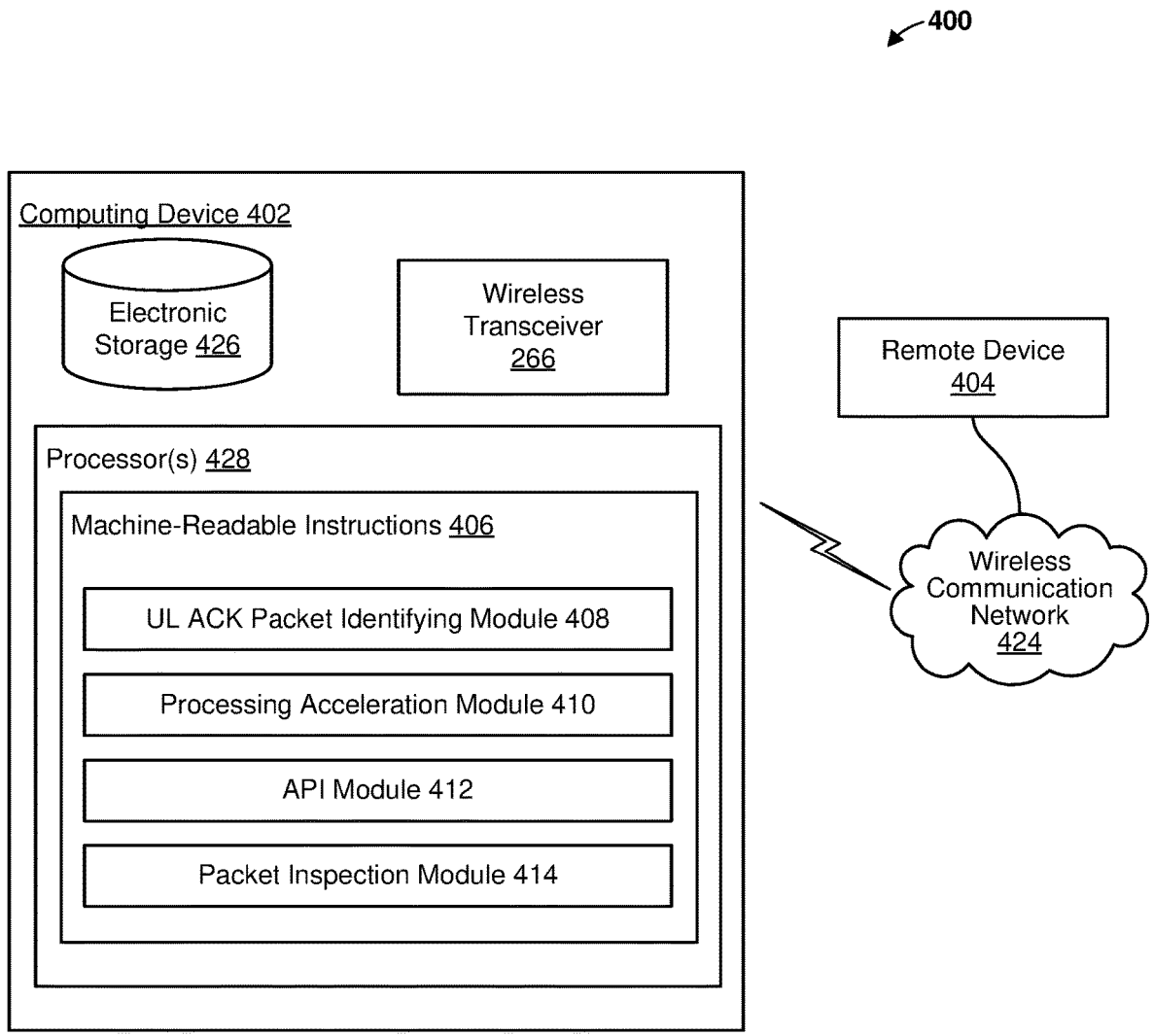
FIG. 4 is a component block diagram illustrating components and processing modules of a computing device suitable for use with various embodiments.

FIG. 4 is a component block diagram illustrating a system 400 configured for managing acknowledgement packets in an uplink data packet stream including encrypted payloads in accordance with various embodiments. With reference to FIGS. 1-4, system 400 may include a computing device 402 (e.g., 120a-120e, 200, 320), a wireless communication network 424, and a remote device 404 (e.g., a server, a wireless device, a computing device, etc.).

The computing device 402 may include one or more processors 428 coupled to electronic storage 426 and a wireless transceiver (e.g., 266). In the computing device 402, the wireless transceiver 266 may be configured to receive messages sent in transmissions (e.g., from the remote device 404 via the wireless communication system 424) and pass such message to the processor(s) 428 for processing. Similarly, the processor 428 may be configured to send messages for transmission to the wireless transceiver 266 for transmission via the wireless communication network 424 to the remote device 404.

The processor(s) 428 may be configured by machine-readable instructions 406. Machine-readable instructions 406 may include one or more instruction modules. The instruction modules may include computer program modules. The instruction modules may include one or more of a UL ACK packet identifying module 408, a processing acceleration module 410, an API module 412, a packet inspection module 414, or other instruction modules.

The UL ACK packet identifying module 408 may be configured to receive via a cross-layer API information enabling the computing device to identify packets for accelerated processing. The UL ACK packet identifying module 408 may be configured to receive information via the cross-layer API that packets having a specified DSCP value should receive accelerated processing, and identify packets within the uplink data packet stream having the specified DSCP value as UL ACK packets. The UL ACK packet identifying module 408 may be configured to receive via a cross-layer API from an application sending the uplink data packet stream, a request to accelerate processing of UL ACK packets. The UL ACK packet identifying module 408 may be configured to identify UL ACK packets based on whether packet lengths of packets meet a packet length threshold or meet a packet length range.

The UL ACK packet identifying module 408 may be configured to identify two or more groups of packets within the uplink data packet stream that meet a packet length threshold, wherein each of the two or more groups is associated with a respective detection frequency and a packet length range. The UL ACK packet identifying module 408 may be configured to identify packets as UL ACK packets in response to determining that a packet length of the packets meets the packet length range of the most frequently detected of the two or more groups of packets. The UL ACK packet identifying module 408 may be configured to receiving via a cross-layer API information enabling the computing device to identify packets for accelerated processing, and use the received information to identify packets within the uplink data packet stream for accelerated processing. The UL ACK packet identifying module 408 may be configured to receive information via a cross-layer application program interface (API) that packets having a specified differentiated services field codepoint (DSCP) value should receive accelerated processing, and identify packets within the uplink data packet stream having the specified DSCP value as UL ACK packets.

The processing acceleration module 410 may be configured to use the received information to identify packets within the uplink data packet stream for accelerated processing. The processing acceleration module 410 may be configured to place identified UL ACK packets in a high priority queue for uplink transmission. The processing acceleration module 410 may be configured to alter a header of identified UL ACK packets to identify the identified UL ACK packets for accelerated processing. The UL ACK packet identifying module 408 may be configured to receive via a cross-layer application program interface (API) from an application sending the uplink data packet stream, a request to accelerate processing of UL ACK packets. The processing acceleration module 410 may be configured to operate or control the operations of an API such as a cross-layer API, including receiving information from an application relevant to identifying UL ACK packets and/or accelerating processing of identified UL ACK packets.

The packet inspection module 414 may be configured to inspect packets of an uplink data stream, e.g., received from an application. The packet inspection module 414 may be configured to determine a packet length of a packet in the uplink data stream. The packet inspection module 414 may be configured to inspect a header portion of packets of the uplink data stream. In some embodiments, the packet inspection module may be configured to communicate with, operate with, or function as a module of, the UL ACK identifying module 408.

The electronic storage 426 may include non-transitory storage media that electronically stores information. The electronic storage media of electronic storage 426 may include one or both of system storage that is provided integrally (i.e., substantially non-removable) with the computing device 402 and/or removable storage that is removably connectable to the computing device 402 via, for example, a port (e.g., a universal serial bus (USB) port, a firewire port, etc.) or a drive (e.g., a disk drive, etc.). Electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 may include one or more virtual storage resources (e.g., cloud storage, a virtual private network, and/or other virtual storage resources). Electronic storage 426 may store software algorithms, information determined by processor(s) 428, information received from the computing device 402, or other information that enables the computing device 402 to function as described herein.

Processor(s) 428 may be configured to provide information processing capabilities in the computing device 402. As such, the processor(s) 428 may include one or more of a digital processor, an analog processor, a digital circuit designed to process information, an analog circuit designed to process information, a state machine, and/or other mechanisms for electronically processing information. Although the processor(s) 428 are illustrated as single entities, this is for illustrative purposes only. In some embodiments, the processor(s) 428 may include a plurality of processing units and/or processor cores. The processing units may be physically located within the same device, or processor(s) 428 may represent processing functionality of a plurality of devices operating in coordination. The processor(s) 428 may be configured to execute modules 408-414 and/or other modules by software; hardware; firmware; some combination of software, hardware, and/or firmware; and/or other mechanisms for configuring processing capabilities on processor(s) 428. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-414 described below is for illustrative purposes, and is not intended to be limiting, as any of modules 408-414 may provide more or less functionality than is described. For example, one or more of the modules 408-414 may be eliminated, and some or all of its functionality may be provided by other modules 408-414. As another example, the processor(s) 428 may be configured to execute one or more additional modules that may perform some or all of the functionality attributed below to one of the modules 408-414.

Figure 5A:
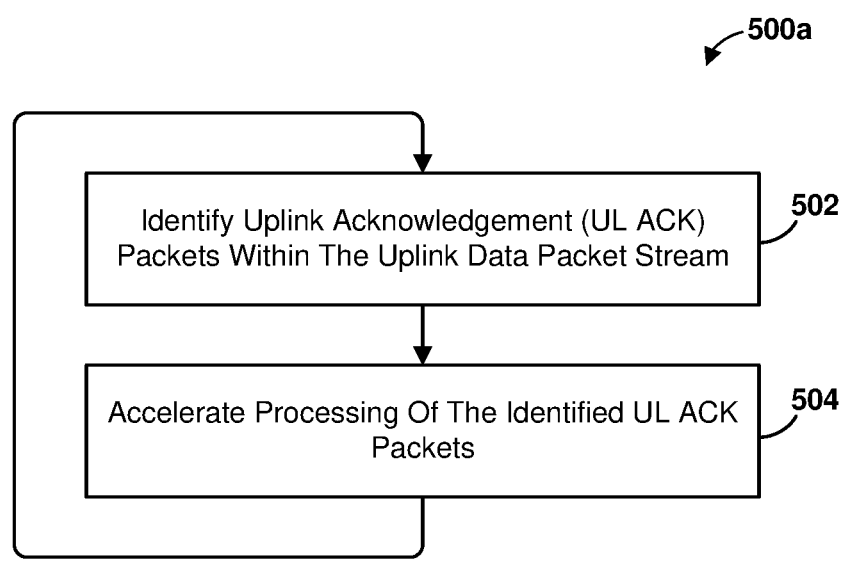
FIG. 5A is a process flow diagram illustrating a method that may be performed by a processor of a computing device for managing acknowledgement packets in an uplink data packet stream according to various embodiments.
Figure 5B:
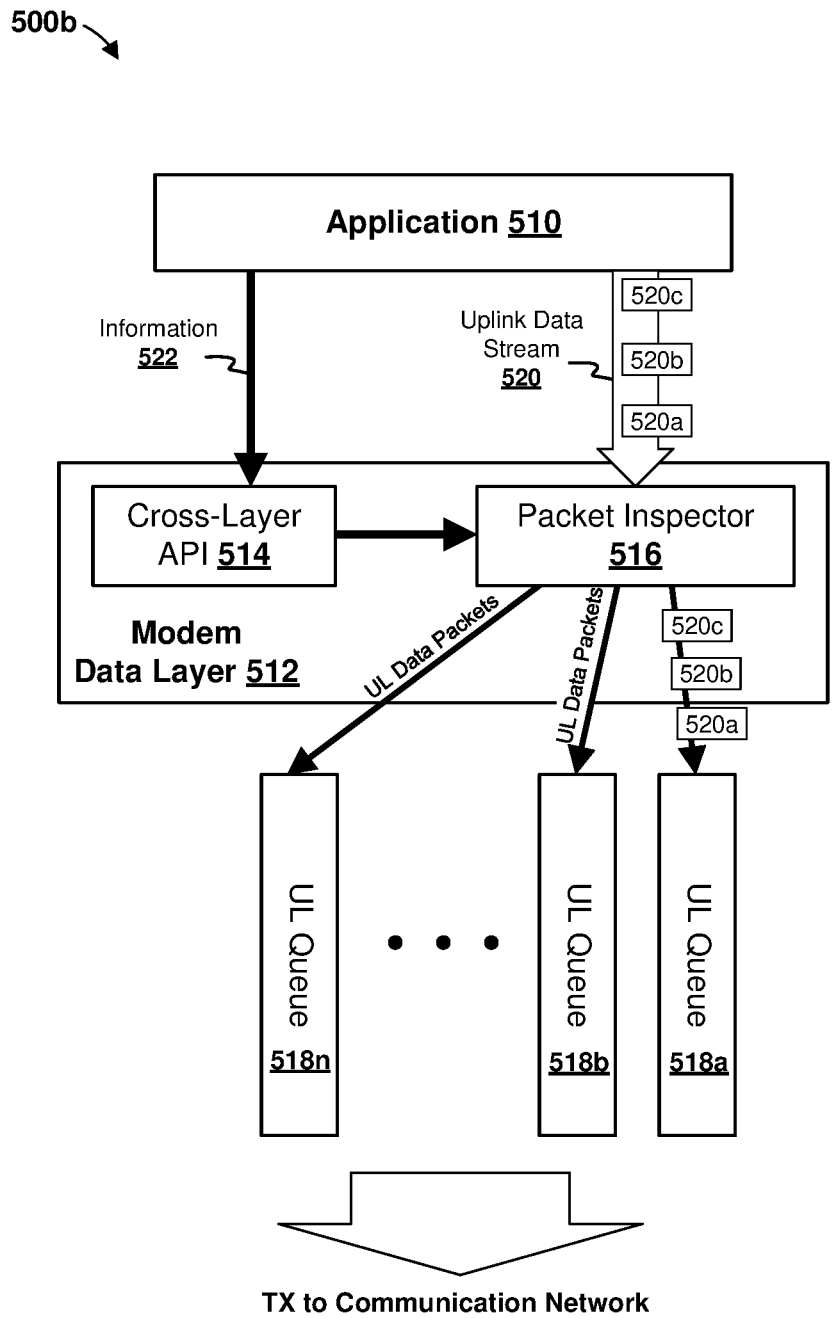
FIG. 5B is a component block diagram illustrating communications exchanged among aspects of a communication device during the method for managing acknowledgement packets in an uplink data packet stream according to various embodiments.

FIG. 5A is a process flow diagram illustrating a method 500a that may be performed by a processor of a computing device for managing acknowledgement packets in an uplink data packet stream including encrypted payloads according to various embodiments. FIG. 5B is a component block diagram 500b illustrating communications exchanged among aspects of a communication device during the method 500a for managing acknowledgement packets in an uplink data packet stream including encrypted payloads according to various embodiments. With reference to FIGS. 1-5B, the operations of the method 500a may be performed by a processor (such as the processor 210, 212, 214, 216, 218, 252, 260, 428) of a computing device (such as the computing device 120a-120e, 200, 320, 402).

In block 502, the processor may identify UL ACK packets within an uplink data packet stream including encrypted payloads. For example, the application 510 may send an uplink data stream 520 that includes secured (e.g., encrypted) uplink data packets and UL ACK packets 520a, 520b, 520c to the modem data layer 512. In some embodiments, a modem data layer 512 may include a cross-layer API 514 that is configured to receive information 522 for processing UL ACK packets 520a, 520b, and 520c from an application 510 that sends the UL ACK packets. In some embodiments, the data stream 520 may include data packets and/or UL ACK packets 520a, 520b, 520c that are configured according to Stream Control Transmission Protocol (SCTP) Quick User Datagram Protocol (UDP) Internet Connections (QUIC), another suitable protocol. In some embodiments, the information 522 may indicate that the processing of the UL ACK packets 520a, 520b, 520c should be accelerated. In some embodiments, the information 522 may include an indication of a flow (e.g., the uplink data stream 520) that may include a destination IP address, a port identifier (e.g., a UDP port number), and/or other suitable information indicating the flow or uplink data stream 520. In some embodiments, the information 522 received via the cross-layer API 514 may indicate that processing should be accelerated for packets having a certain code or value in a header portion, such as a particular differentiated services field codepoint (DSCP) value. In some embodiments, the information 522 received via the cross-layer API 514 may indicate a packet length threshold or a packet length range. In some embodiments, the information 522 received via the cross-layer API 514 may include a request to accelerate processing of UL ACK packets 520a, 520b, 520c. Means for performing the operations of block 502 may include the processors 210, 212, 214, 216, 218, 252, and 260, the interconnection/bus module 250, the UL ACK packet identifying module 408, and the API module 412.

In block 504, the processor may accelerate processing of the identified UL ACK packets. In some embodiments, accelerating the processing of identified UL ACK packets may include placing identified UL ACK packets 520a, 520b, 520c in a high priority queue for uplink transmission (as one example, UL queue 518a). In some embodiments, the high priority queue may include UL data packets and UL ACK packets. In some embodiments, the high priority queue may include only UL ACK packets. In some embodiments, accelerating the processing of identified UL ACK packets 520a, 520b, 520c may include may include altering a header of identified UL ACK packets 520a, 520b, 520c to identify the identified UL ACK packets 520a, 520b, 520c for accelerated processing. For example, a computing device may be configured to support Quality of Service (QoS) processing of uplink packets based on a DSCP value in a header portion of each packet ("DSCP-aware processing"). In such implementations, the packet inspector may overwrite the DSCP value or marking of identified IP packets for accelerated processing (e.g., low latency treatment). Means for performing the operations of block 504 may include the processors 210, 212, 214, 216, 218, 252, and 260, the interconnection/bus module 250, and the processing acceleration module 410.

The processor may repeat the operations of blocks 502 and 504 from time to time.

Figure 5C:
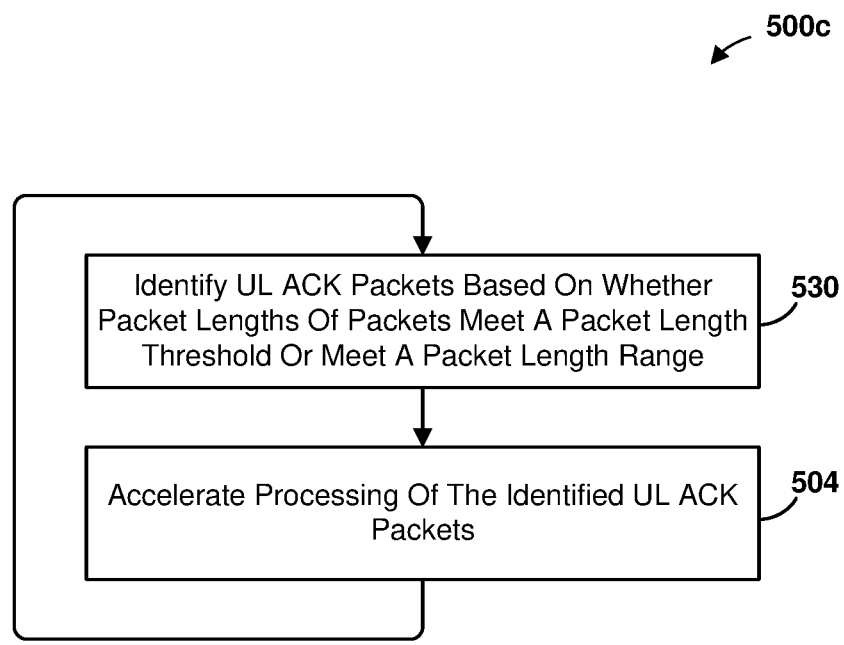
FIGS. 5C-5E are process flow diagrams illustrating operations that may be performed by a processor of a computing device as part of the method for managing acknowledgement packets in an uplink data packet stream according to some embodiments.
Figure 5D:
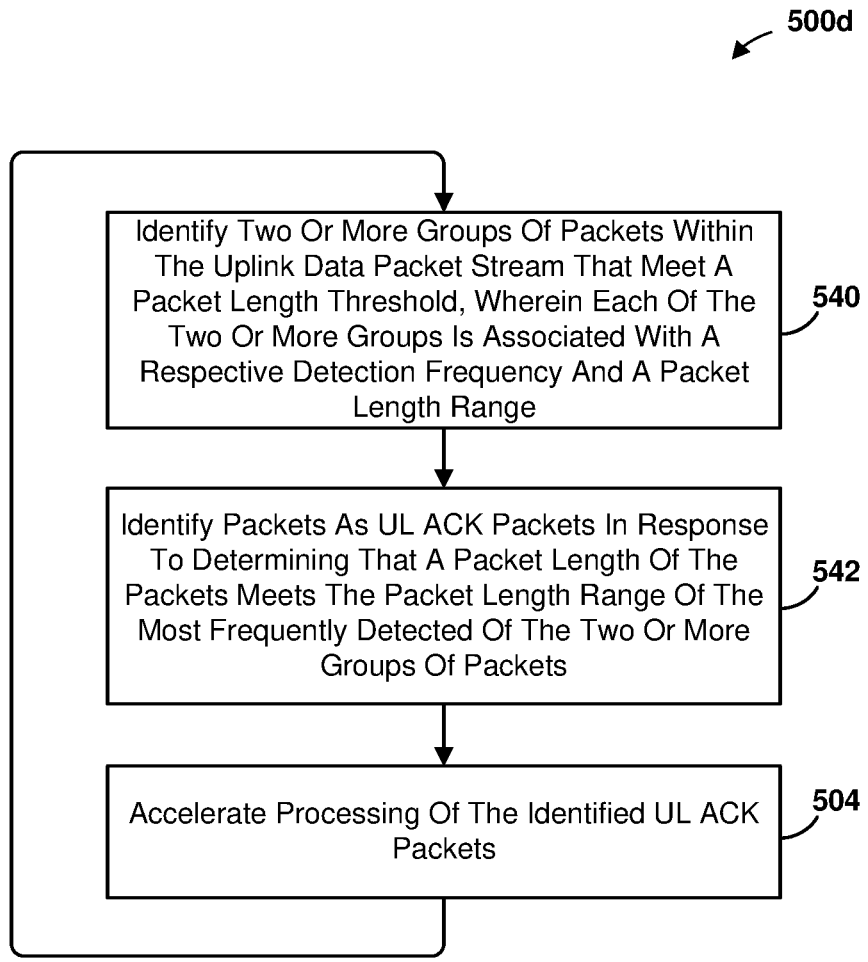
Figure 5E:
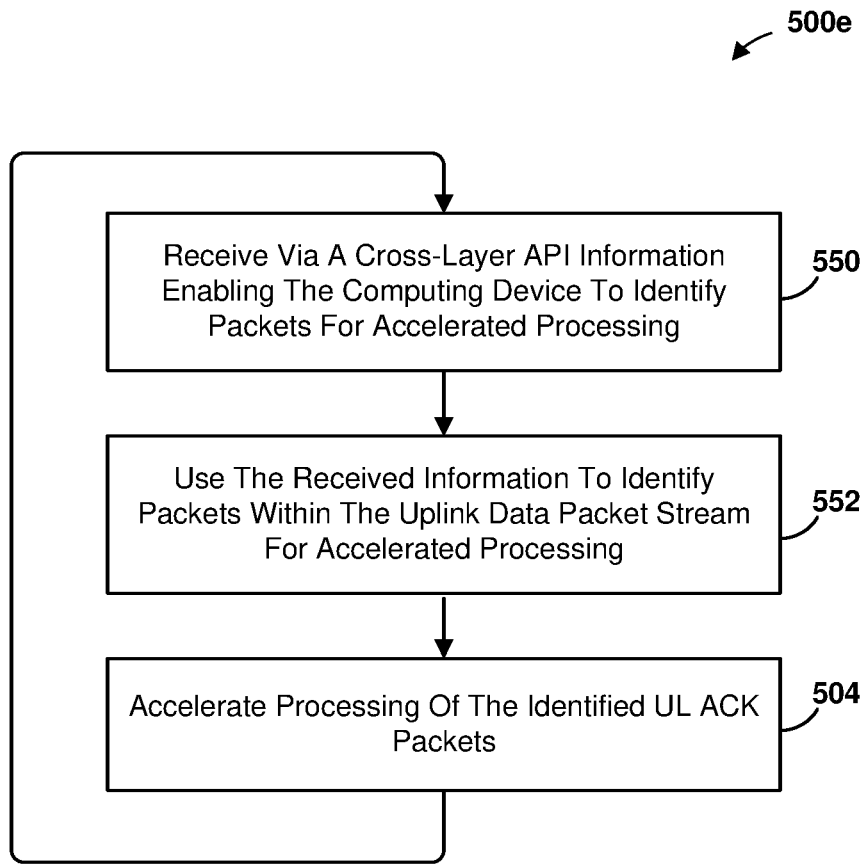

FIGS. 5C-5E are process flow diagrams illustrating operations 500c, 500d and 500e that may be performed by a processor of a computing device as part of the method for managing acknowledgement packets in an uplink data packet stream including encrypted payloads according to some embodiments. With reference to FIGS. 1-5E, the operations 500c-500e may be performed by a processor (such as the processor 210, 212, 214, 216, 218, 252, 260, 428) of a computing device (such as the computing device 120a-120e, 200, 320, 402).

Referring to FIG. 5C, as an example of the operations performed in block 502 (FIG. 5A), in some embodiments, the processor may identify UL ACK packets that are encrypted based on whether packet lengths of packets meet a packet length threshold or meet a packet length range in block 530. For example, an application executing on a computing device (e.g., the application 510) may send information (e.g., 522) about a data packet stream (e.g., a data flow) including encrypted payloads, such as a destination IP address, a port value, and the like, that may enable identification of the data packet stream. In some embodiments, the application may send the information to a modem data layer (e.g., 512) via a cross-layer API (e.g., 514). The cross-layer API may send such information to a packet inspector (e.g., 516).

The packet inspector may receive packets in a data packet stream (e.g., 520) and may inspect (examine, analyze) the received packets. In some embodiments, the packet inspector may determine a packet length of each of the received packets. In some embodiments, the packet inspector may identify packets having a length (or size) meeting (e.g., equal to, or equal to or below) a packet length threshold. In some embodiments, the packet inspector may identify packets having a length (or size) that meets a packet length range (e.g., is within a packet length range, or having a packet length greater than (and/or equal to) a lower packet length threshold and less than (and/or equal to) a higher packet length threshold). In some embodiments, the packet inspector may identify packets that meet the packet length threshold or meet the packet length range as UL ACK packets. In some embodiments, the packet length threshold and/or packet length range may be provided by the application via the cross-layer API. In some embodiments, the packet inspector may select the packet length threshold and/or packet length range based on an expected ACK packet length. In some embodiments, the packet inspector may select the packet length threshold and/or packet length range based on an analysis of packet sizes in the uplink data stream to determine a typical or expected ACK packet length.

In some embodiments, the packet inspector may be configured to identify or determine false positive identifications and/or false negative identifications of UL ACK packets. In some embodiments, the packet inspector may be configured to adjust the packet length threshold and/or the packet length range based on an identification of false positive identifications and/or false negative identifications of UL ACK packets. Means for performing the operations of block 530 may include the processors 210, 212, 214, 216, 218, 252, and 260, the interconnection/bus module 250, the packet inspection module 414, and the API module 412.

In block 504, the processor may accelerate processing of the identified UL ACK packets, as described. The processor may repeat the operations of blocks 510 and 504 from time to time.

Referring to FIG. 5D, as an example of the operations performed in block 502 (FIG. 5A), in some embodiments, the processor may identify two or more groups of packets within the uplink data packet stream that meet a packet length threshold, wherein each of the two or more groups is associated with a respective detection frequency and a packet length range in block 540. For example, ACK packets may be expected to be relatively frequent, as well as relatively small (as compared to data packets). In some embodiments, the computing device may identify UL ACK packets by identifying two more groups of packets of a specified flow (i.e., an uplink data packet stream). In such embodiments, each of the two or more groups may be associated with a detection frequency and a packet length range. Means for performing the operations of block 540 may include the processors 210, 212, 214, 216, 218, 252, and 260, the interconnection/bus module 250, and the UL ACK packet identifying module 408.

In block 542, the processor may identify packets as UL ACK packets in response to determining that a packet length of the packets meets the packet length range of the most frequently detected of the two or more groups of packets. In some embodiments, the computing device may identify one or more groups of packets having a packet length below a threshold or within a packet length range. In some embodiments, the computing device may identify the most frequently detected of such groups of packets. In some embodiments, the computing device may identify one or more packets as UL ACK packets in response to determining that the packet length of the one or more packets meets (falls within) the packet length range of the most frequently detected group of packets. In some embodiments, the computing device may identify one or more packets as UL ACK packets in response to determining that the packet length of the one or more packets meets (falls within) the packet length range of the most frequently detected group of packets, in which the packet lengths of the packets (or the packet length range) is below a threshold packet length. Means for performing the operations of block 542 may include the processors 210, 212, 214, 216, 218, 252, and 260, the interconnection/bus module 250, and the UL ACK packet identifying module.

In block 504, the processor may accelerate processing of the identified UL ACK packets, as described. The processor may repeat the operations of blocks 510 and 504 from time to time.

Referring to FIG. 5E, as an example of the operations performed in block 502 (FIG. 5A), in some embodiments, the processor may receive via a cross-layer API information enabling the computing device to identify packets for accelerated processing in block 550. In some embodiments, the application (e.g., 510) sending the uplink data stream including encrypted payloads (e.g., 520) may specify a DSCP value that is associated with low latency or accelerated processing. In some embodiments, the DSCP value may uniquely identify UL ACK packets. In some embodiments, the DSCP value may be associated with data packets and ACK packets sent by the application, in which case any packets (including data packets and ACK packets) having such DSCP value may receive accelerated processing. Means for performing the operations of block 550 may include the processors 210, 212, 214, 216, 218, 252, and 260, the interconnection/bus module 250, the UL ACK packet identifying module 408, and the API module 412.

In block 552, the processor may use the received information to identify packets within the uplink data packet stream for accelerated processing. For example, as noted above, a specified DSCP value in a packet header portion that is not encrypted may be associated with accelerated processing. In some embodiments, the DSCP value may be associated with data packets and ACK packets sent by the application, in which case any packets (including data packets and ACK packets) having such a DSCP value in a packet header portion that is not encrypted may receive accelerated processing. In some embodiments, a DSCP value in a packet header portion that is not encrypted may uniquely identify UL ACK packets for accelerated processing. In some embodiments, the information received by the modem data layer via the cross-layer API may indicate that packets having a specified DSCP value are UL ACK packets. Means for performing the operations of block 552 may include the processors 210, 212, 214, 216, 218, 252, and 260, the interconnection/bus module 250, and the processing acceleration module 410.

In block 504, the processor may accelerate processing of the identified UL ACK packets, as described. The processor may repeat the operations of blocks 510 and 504 from time to time.

Figure 6:
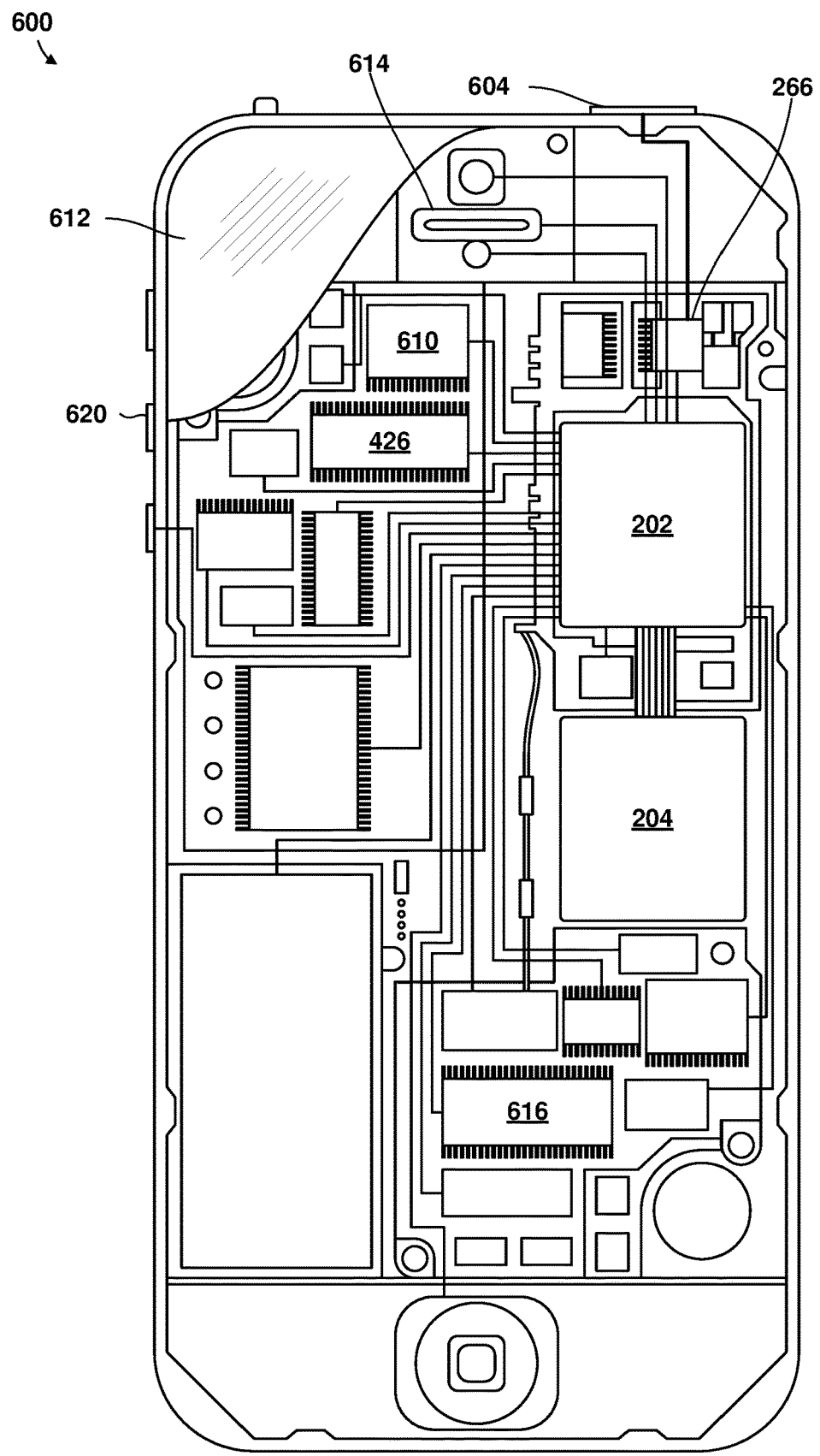
FIG. 6 is a component block diagram of a computing device suitable for use with various embodiments.

FIG. 6 is a component block diagram of a computing device 600 suitable for use with various embodiments. With reference to FIGS. 1-6, various embodiments may be implemented on a variety of computing devices 600 (for example, the computing device 120a-120e, 200, 320, 402), an example of which is illustrated in FIG. 6 in the form of a smartphone. The computing device 600 may include a first SOC 202 (for example, a SOC-CPU) coupled to a second SOC 204 (for example, a 5G capable SOC). The first and second SOCs 202, 204 may be coupled to internal memory 616, a display 612, and to a speaker 614. Additionally, the computing device 600 may include an antenna 604 for sending and receiving electromagnetic radiation that may be connected to a wireless transceiver 266 coupled to one or more processors in the first and/or second SOCs 202, 204. Computing device 600 may include menu selection buttons or rocker switches 620 for receiving user inputs.

The computing device 600 computing device 600 may include a sound encoding/decoding (CODEC) circuit 610, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 266 and CODEC 610 may include a digital signal processor (DSP) circuit (not shown separately).

The processors of the computing device 600 may be any programmable microprocessor, microcomputer or multiple processor chip or chips that can be configured by software instructions (applications) to perform a variety of functions, including the functions of some implementations described below. In some wireless devices, multiple processors may be provided, such as one processor within an SOC 204 dedicated to wireless communication functions and one processor within an SOC 202 dedicated to running other applications. Software applications may be stored in the memory 616 before they are accessed and loaded into the processor. The processors may include internal memory sufficient to store the application software instructions.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations 500a, 500c, 500d, and 500e may be substituted for or combined with one or more operations of the methods and operations 500a, 500c, 500d, and 500e.

Implementation examples are described in the following paragraphs. While some of the following implementation examples are described in terms of example methods, further example implementations may include: the example methods discussed in the following paragraphs implemented by a computing device including a processor configured with processor-executable instructions to perform operations of the methods of the following implementation examples; the example methods discussed in the following paragraphs implemented by a computing device including means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1. A method performed by a computing device for managing acknowledgement packets in an uplink data packet stream that includes encrypted payloads, including identifying uplink acknowledgement (UL ACK) packets within the uplink data packet stream including encrypted payloads, and accelerating processing of the identified UL ACK packets.

Example 2. The method of example 1, further including receiving, via a cross-layer application program interface (API) from an application sending the uplink data packet stream, a request to accelerate processing of UL ACK packets.

Example 3. The method of either of examples 1 or 2, in which identifying UL ACK packets within the uplink data packet stream includes identifying UL ACK packets based on whether packet lengths of packets meet a packet length threshold or meet a packet length range.

Example 4. The method of any of examples 1-3, in which identifying UL ACK packets within the uplink data packet stream includes identifying two or more groups of packets within the uplink data packet stream that meet a packet length threshold, in which each of the two or more groups of packets within the uplink data packet stream that meet a packet length threshold is associated with a respective detection frequency and a packet length range, and identifying packets as UL ACK packets in response to determining that a packet length of the packets meets the packet length range of the most frequently detected of the two or more groups of packets.

Example 5. The method of any of examples 1-4, in which identifying UL ACK packets within the uplink data packet stream includes receiving via a cross-layer application program interface (API) information enabling the computing device to identify packets for accelerated processing, and using the received information to identify packets within the uplink data packet stream for accelerated processing.

Example 6. The method of any of examples 1-5, in which identifying UL ACK packets within the uplink data packet stream includes receiving information via a cross-layer application program interface (API) that packets having a specified differentiated services field codepoint (DSCP) value should receive accelerated processing, and identifying packets within the uplink data packet stream having the specified DSCP value in a packet header portion that is not encrypted as UL ACK packets.

Example 7. The method of example 6, in which receiving information via the cross-layer API that packets having a specified DSCP value should receive accelerated processing includes receiving information via the cross-layer API that packets having a specified DSCP value are UL ACK packets.

Example 8. The method of any of examples 1-7, in which accelerating the processing of identified UL ACK packets includes one of placing identified UL ACK packets in a high priority queue for uplink transmission, or altering a header of identified UL ACK packets to identify the identified UL ACK packets for accelerated processing.

Example 9. The method of any of examples 1-8, in which the UL ACK packets include Stream Control Transmission Protocol (SCTP) packets or Quick User Datagram Protocol Internet Connections (QUIC) packets.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a computing device for managing acknowledgement packets in an uplink data packet stream that includes encrypted payloads, comprising:
   identifying uplink acknowledgement (UL ACK) packets within the uplink data packet stream including encrypted payloads, comprising
   identifying two or more groups of packets within the uplink data packet stream that meet a packet length threshold, wherein each of the two or more groups of packets within the uplink data packet stream that meet a packet length threshold is associated with a respective detection frequency and a packet length range; and
   identifying packets as UL ACK packets in response to determining that a packet length of the packets meets the packet length range of the most frequently detected of the two or more groups of packets; and
   accelerating processing of the identified UL ACK packets.

2. The method of claim 1, further comprising receiving, via a cross-layer application program interface (API) from an application sending the uplink data packet stream, a request to accelerate processing of UL ACK packets.

3. The method of claim 1, wherein identifying UL ACK packets within the uplink data packet stream comprises identifying UL ACK packets based on whether packet lengths of packets meet a packet length threshold or meet a packet length range.

4. The method of claim 1, wherein identifying UL ACK packets within the uplink data packet stream comprises:
   receiving via a cross-layer application program interface (API) information enabling the computing device to identify packets for accelerated processing; and
   using the received information to identify packets within the uplink data packet stream for accelerated processing.

5. The method of claim 1, wherein identifying UL ACK packets within the uplink data packet stream comprises:
   receiving information via a cross-layer application program interface (API) that packets having a specified differentiated services field codepoint (DSCP) value should receive accelerated processing; and
   identifying packets within the uplink data packet stream having the specified DSCP value in a packet header portion that is not encrypted as UL ACK packets.

6. The method of claim 5, wherein receiving information via the cross-layer API that packets having a specified DSCP value should receive accelerated processing comprises receiving information via the cross-layer API that packets having a specified DSCP value are UL ACK packets.

7. The method of claim 1, wherein accelerating processing of identified UL ACK packets comprises one of placing identified UL ACK packets in a high priority queue for uplink transmission, or altering a header of identified UL ACK packets to identify the identified UL ACK packets for accelerated processing.

8. The method of claim 1, wherein the UL ACK packets comprise Stream Control Transmission Protocol (SCTP) packets or Quick User Datagram Protocol Internet Connections (QUIC) packets.

9. A computing device, comprising:
   a processor configured to:
      identify uplink acknowledgement (UL ACK) packets within an uplink data packet stream including encrypted payloads, wherein the processor is further configured to:
         identify two or more groups of packets within the uplink data packet stream that meet a packet length threshold, wherein each of the two or more groups of packets within the uplink data packet stream that meet a packet length threshold is associated with a respective detection frequency and a packet length range; and identify packets as UL ACK packets in response to determining that a packet length of the packets meets the packet length range of the most frequently detected of the two or more groups of packets; and
accelerate processing of the identified UL ACK packets.

10. The computing device of claim 9, wherein the processor is further configured to receive, via a cross-layer application program interface (API) from an application sending the uplink data packet stream, a request to accelerate processing of UL ACK packets.

11. The computing device of claim 9, wherein the processor is further configured to identify UL ACK packets based on whether packet lengths of packets meet a packet length threshold or meet a packet length range.

12. The computing device of claim 9, wherein the processor is further configured to:
receive via a cross-layer application program interface (API) information enabling the computing device to identify packets for accelerated processing; and
use the received information to identify packets within the uplink data packet stream for accelerated processing.

13. The computing device of claim 9, wherein the processor is further configured to:
receive information via a cross-layer application program interface (API) that packets having a specified differentiated services field codepoint (DSCP) value should receive accelerated processing; and
identify packets within the uplink data packet stream having the specified DSCP value in a packet header portion that is not encrypted as UL ACK packets.

14. The computing device of claim 13, wherein the processor is further configured to receive information via the cross-layer API that packets having a specified DSCP value are UL ACK packets.

15. The computing device of claim 9, wherein the processor is further configured to accelerate processing of the identified UL ACK packets by either placing identified UL ACK packets in a high priority queue for uplink transmission, or altering a header of identified UL ACK packets to identify the identified UL ACK packets for accelerated processing.

16. The computing device of claim 9, wherein the processor is further configured to identify UL ACK packets that are Stream Control Transmission Protocol (SCTP) packets or Quick User Datagram Protocol Internet Connections (QUIC) packets.

17. A computing device, comprising:
means for identifying uplink acknowledgement (UL ACK) packets within an uplink data packet stream including encrypted payloads, comprising
means for identifying two or more groups of packets within the uplink data packet stream that meet a packet length threshold, wherein each of the two or more groups of packets within the uplink data packet stream that meet a packet length threshold is associated with a respective detection frequency and a packet length range;
means for identifying packets as UL ACK packets in response to determining that a packet length of the packets meets the packet length range of the most frequently detected of the two or more groups of packets; and
means for accelerating processing of the identified UL ACK packets.

18. The computing device of claim 17, further comprising means for receiving, via a cross-layer application program interface (API) from an application sending the uplink data packet stream, a request to accelerate processing of UL ACK packets.

19. The computing device of claim 17, wherein means for identifying UL ACK packets within the uplink data packet stream comprises means for identifying UL ACK packets based on whether packet lengths of packets meet a packet length threshold or meet a packet length range.

20. The computing device of claim 17, wherein means for identifying UL ACK packets within the uplink data packet stream comprises:
means for receiving via a cross-layer application program interface (API) information enabling the computing device to identify packets for accelerated processing; and
means for using the received information to identify packets within the uplink data packet stream for accelerated processing.

21. The computing device of claim 17, wherein means for identifying UL ACK packets within the uplink data packet stream comprises:
means for receiving information via a cross-layer application program interface (API) that packets having a specified differentiated services field codepoint (DSCP) value should receive accelerated processing; and
means for identifying packets within the uplink data packet stream having the specified DSCP value in a packet header portion that is not encrypted as UL ACK packets.

22. The computing device of claim 21, wherein means for receiving information via the cross-layer API that packets having a specified DSCP value should receive accelerated processing comprises means for receiving information via the cross-layer API that packets having a specified DSCP value are UL ACK packets.

23. The computing device of claim 17, wherein means for accelerating processing of identified UL ACK packets comprises one of means for placing identified UL ACK packets in a high priority queue for uplink transmission, or means for altering a header of identified UL ACK packets to identify the identified UL ACK packets for accelerated processing.

24. The computing device of claim 17, wherein the UL ACK packets comprise Stream Control Transmission Protocol (SCTP) packets or Quick User Datagram Protocol Internet Connections (QUIC) packets.

25. A non-transitory processor-readable medium having stored thereon processor-executable instructions configured to cause a processing device in a computing device to perform operations comprising:
identifying uplink acknowledgement (UL ACK) packets within an uplink data packet stream including encrypted payloads, comprising
identifying two or more groups of packets within the uplink data packet stream that meet a packet length threshold, wherein each of the two or more groups of packets within the uplink data packet stream that meet a packet length threshold is associated with a respective detection frequency and a packet length range; and
identifying packets as UL ACK packets in response to determining that a packet length of the packets meets the packet length range of the most frequently detected of the two or more groups of packets; and
accelerating processing of the identified UL ACK packets.

26. The non-transitory processor-readable medium of claim 25, wherein the stored processor-executable instructions are further configured to cause the processing device in the computing device to perform operations comprising receiving, via a cross-layer application program interface (API) from an application sending the uplink data packet stream, a request to accelerate processing of UL ACK packets.

27. The non-transitory processor-readable medium of claim 25, wherein the stored processor-executable instructions are further configured to cause the processing device in the computing device to perform operations such that identifying UL ACK packets within the uplink data packet stream comprises identifying UL ACK packets based on whether packet lengths of packets meet a packet length threshold or meet a packet length range.

* * * * *